United States Patent [19]

Stubenberg et al.

[11] Patent Number: 4,711,129
[45] Date of Patent: Dec. 8, 1987

[54] PRESSURE SENSOR

[75] Inventors: Johann Stubenberg, Gleichenberg; Heimo Denk; Rudolf Zeiringer, both of Graz, all of Austria

[73] Assignee: AVL Gesellschaft für Verbrennungskraftmaschinen und Messtechnik m.b.H. Prof. Dr.Dr.h.c. Hans List, Graz, Austria

[21] Appl. No.: 835,214

[22] Filed: Mar. 3, 1986

[30] Foreign Application Priority Data

Mar. 5, 1985 [AT] Austria .................... 655/85

[51] Int. Cl.$^4$ .................... G01L 7/08; G01L 19/04
[52] U.S. Cl. .................... 73/708; 73/715
[58] Field of Search .............. 73/715, 708, 716, 717, 73/718, 719, 720, 721, 722, 723, 724, 725, 726, 727, 728, 756, 753, 754, DIG. 4

[56] References Cited

U.S. PATENT DOCUMENTS 3,801,838  4/1974  Kistler .................... 310/8.7

FOREIGN PATENT DOCUMENTS 258610 12/1967 Austria .
264156  8/1968 Austria .
283010  7/1970 Austria .
348794  3/1979 Austria .

Primary Examiner—Donald O. Woodiel
Attorney, Agent, or Firm—Watson, Cole, Grindle & Watson

[57] ABSTRACT

A pressure sensor which comprises one or more measuring elements situated in a housing and a plate membrane sealing the housing against the medium to be measured and being attached to the measuring element on order to transmit the pressure to be measured, the plate membrane having curved or conically-shaped part which extends into the interior of the housing and compensates for temperature shock drifting.

2 Claims, 1 Drawing Figure

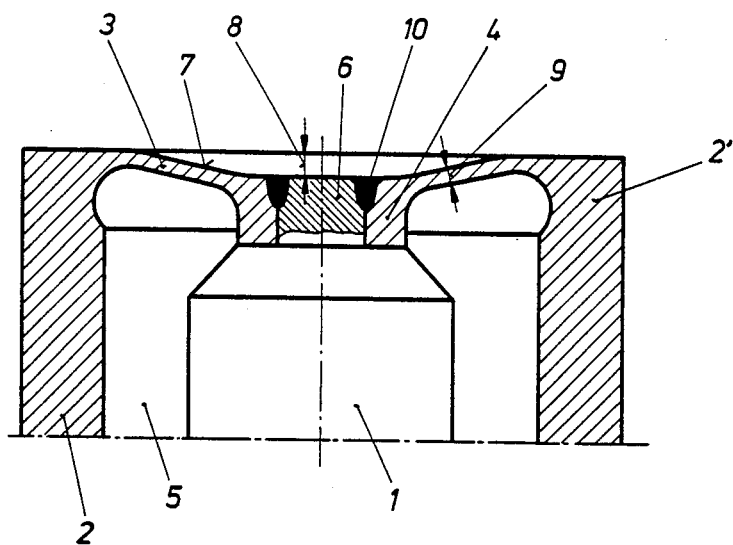

PRESSURE SENSOR

BACKGROUND OF THE INVENTION

This invention relates to a pressure sensor which comprises one or more measuring elements situated in a housing and a plate membrane permanently attached to the housing and sealing the latter against the medium whose pressure is to be measured, the membrane being connected to the measuring element, thereby transmitting the pressure to be measured, and having an annular area adjacent to its periphery and along which it is connected to the housing, the annular area in turn bordering on a center area.

DESCRIPTION OF THE PRIOR ART

A pressure sensor of this kind is for example described in Austrian Pat. No. 283 010. In this device the plate membrane is outwardly curved on account of the positive pre-tension of the measuring element. In case of temperature shocks, e.g., during pressure measurements in media subject to great variations in thermal load, for instance in the combustion chambers of internal combustions engines, rockets, ignition chambers, etc., this curvature will increase due to the more rapid temperature rise in the center part of the membrane, which will reduce the pre-tension of the measuring element. The pressure to be measured, or rather, the pressure curve over time, is thus distorted, the readings being too low.

The pressure sensors discussed in Austrian Pat. Nos. 264,156 and 258.610 also have plate membranes with an outward curvature whose center parts are thicker than the remaining parts, however, carryiing a plate-like rim in the former case, and a protective disk on the outside made of heat-insulating material in the latter. These measures are intended to suppress thermal stresses caused by drastic temperature changes and to delay changes in shape. In both variants, however, no satisfactory compensation of temperature shock drifting has been achieved. In the former case it is the gap between the membrane to be protected and the plate-like rim which will affect the measurement result in various ways, depending on how much dirt has accumulated in it. In the second case it is gas exchange movements to and from the gap which wil occur along with movements of the membrane during operation, above all, if there are pressure variations of higher frequencies, and which may lead to a considerable temperature rise of the membrane, thus affecting the measurement result.

SUMMARY OF THE INVENTION

It is an object of the present invention to eliminate these defects and to develop a pressure sensor in which the decrease in pre-tension following a sudden temperature rise caused by the medium to be measured is automatically compensated in the measuring device.

The basic idea of the invention is to design the plate membrane such that, for the purpose of temperature compensation, any sudden temperature rise (temperature shock) due to the medium to be measured is accompanied by an increase of pre-tension, which will compensate the pre-tension decrease in the measuring element.

According to the invention this task is solved in a pressure-sensor as described by giving the annular area of the plate membrane a curved or conical shape, such that it extends into the interior of the housing.

Due to this inward curvature the rapid temperature rise in the center part of the membrane which normally occurs in plate membranes without any heatshield will cause the increase of pre-tension necessary for compensation. This will compensate in a simple and most efficient way for the harmful thermal expansions caused by temperature shocks.

In U.S. Pat. No. 3,801,838 and in Austrian Pat. No. 348 794 there are shown pressure sensors in which the center area of the membrane is thickened to act as a pressure transmitter. The annular area of the membrane contains annular zones of reduced cross-sections which prevent the pre-tension from being transmitted from the center of the membrane to its periphery and which will increase the elasticity of the membrane—which is flat in its initial position—to such an extent that an outside pressure-load may produce both a convex and a concave curvature. An occasional load-induced concave curvature of the membrane, which is flat in its unloaded stage, will be in the range of a few $\mu$m. It will therefore not be able to compensate for the decrease in pre-tension occuring in the measuring device as a result of a sudden temperature rise.

There are several practical solutions for the design of a pressure sensor according to the invention. One solution is to make the annular area of the plate membrane in its non-assembled state higher than in the assembled state, such that it will be pressed against the measuring element with a positive pre-tension in its assembled state. In this way no permanent attachment is required between plate membrane and measuring element.

According to another solution the plate membrane is flat and its center area is attached to the measuring element in such a way that the annular area extends into the interior of the housing if the negative pre-tension is large enough. This will simplify manufacture and will be of great advantage for mass production.

Finally, the invention provides that the center area be thickened in a known manner and that it be permanently attached to the measuring element, preferably by a projection on the latter. The connection between the center area of the plate membrane and the measuring element may be established by welding, for instance.

DESCRIPTION OF THE DRAWING

Following is a more detailed discussion of the invention as illustrated by the accompanying drawing which presents an axial section.

The measuring element 1 is contained within a housing 2 whose front end carries a plate membrane 3 which is integral with the housing. This plate membrane 3 has a part 7 which is configured as a curved or conical surface and extends into the interior 5 of the housing 2, carrying a thickened part 4 located in the center area of the plate membrane 3. Part 4 contains the cylindrical projection 6 of the measuring element 1 to which it is firmly attached, for instance, by welding, preferably electron beam welding.

The conical part 7 of the plate membrane 3 is ideally provided during manufacture of the membrane. This will permit the membrane to be mounted at positive, negative or zero pre-tension. In a flat membrane the extending of part 7 of the plate membrane 3 into the interior 5 of the housing may also be effected by applying a sufficiently large negative pre-tension during assembly. For this purpose the center area 4 of the plate membrane 3 must be firmly attached to the measuring element 1, e.g., as indicated in the above variant, by providing an annular welded zone 10 between the thickened center part 4 of the plate membrane 3 and the cylindrical projection 6 of the measuring element 1.

In order to achieve that the effect created by the specific configuration of the plate membrane 3 compensates temperature shock drifting of the measuring element 1 not only with regard to its extent but also its development over time, the following details may be optimized empirically or by means of calculation:

shape and size, above all height 8 of the inwardly curved part 7 of the plate membrane 3, relative to the inner or outer diameter of the housing 2;

positive or negative pre-tension of the membrane;

mass ratio between the thickened center part 4 of the plate membrane 3 and the main part 2' of the housing 2;

specific shaping of the center part 4 of the plate membrane 3 and the main part 2' of the housing 2 to achieve faster or slower heat transfer;

membrane thickness 9.

The invention is in no way restricted to the example given above, but permits a multitude of variants. For instance, the plate membrane could be provided with an outer ring and could be configured as a separate element to be welded to the housing, thereby determining the pre-tension of the membrane. In order to achieve a certain elasticity of the plate membrane and to influence the heat transfer between plate membrane and housing, the housing may be provided with a corresponding recess in the area of the plate membrane.

We claim:

1. A pressure sensor comprising a housing which defines an interior, a measuring element situated in the interior of said housing, and a plate membrane which has a center area, an annular area around the center area and a peripheral area around the annular area, said peripheral area of said plate membrane being permanently attached to said housing such that said housing is sealed against a medium whose pressure is to be measured, said plate membrane also being connected to said measuring element so as to transmit the pressure to be measured to said measuring element, adjacent to its periphery along which it is connected to said housing having an annular area bordering on a center area, and said annular area of said plate membrane, in its unloaded condition, having a curved or conical shape and extending into the interior of said housing, and said annular area of said plate membrane being higher in its non-assembled state than after assembly, such that it is pressed against said measuring element with a positive pretension in its assembled state.

2. A pressure sensor according to claim 1, wherein said center area is thickened, and wherein said center area is pemanently attached to said measuring element.

* * * * *